United States Patent
Dominique et al.

(10) Patent No.: US 7,356,749 B2
(45) Date of Patent: Apr. 8, 2008

(54) METHOD AND APPARATUS FOR DETECTING A THREE-STATE SIGNAL IN A BASE STATION IN A WIRELESS COMMUNICATIONS SYSTEM

(75) Inventors: Francis Dominique, Rockaway, NJ (US); Srinivas R. Kadaba, Chatham, NJ (US); Hongwei Kong, Denville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 682 days.

(21) Appl. No.: 10/770,028

(22) Filed: Feb. 2, 2004

(65) Prior Publication Data
US 2005/0169405 A1 Aug. 4, 2005

(51) Int. Cl.
*G08C 25/02* (2006.01)
(52) U.S. Cl. .................... 714/748; 714/749
(58) Field of Classification Search ........... 375/262; 455/24
See application file for complete search history.

(56) References Cited

U.S. PATENT DOCUMENTS 5,850,505 A * 12/1998 Grover et al. ............ 714/4
6,184,863 B1 * 2/2001 Sibert et al. ............. 345/156
2003/0099211 A1 * 5/2003 Moulsley et al. ......... 370/328
2003/0100268 A1 * 5/2003 Moulsley et al. ......... 455/69
2003/0131299 A1 * 7/2003 Ahn et al. ............... 714/748
2005/0042985 A1 * 2/2005 Cheng et al. ............. 455/24

FOREIGN PATENT DOCUMENTS

WO    WO 00/22693     4/2000
WO    WO 2004/066520  8/2004

OTHER PUBLICATIONS

European Search Report, Appl. No. 05250277.0-2415 PCT/, (Jul. 27, 2005).

* cited by examiner

*Primary Examiner*—Shuwang Liu
*Assistant Examiner*—David Huang

(57) ABSTRACT

A decision as to whether a mobile terminal has transmitted an ACK, a NACK or a NULL from a received signal at a base station is made by successively eliminating one of the three possible transmitted symbols by sequentially applying decision rules that maximize network throughput by minimizing the sum of the weighted costs of making a decision based on the magnitude of the received signal.

8 Claims, 3 Drawing Sheets

METHOD AND APPARATUS FOR DETECTING A THREE-STATE SIGNAL IN A BASE STATION IN A WIRELESS COMMUNICATIONS SYSTEM

TECHNICAL FIELD

This invention relates to wireless communications, and more particularly, to the processing of a signal received at a base station in a wireless communications system.

BACKGROUND OF THE INVENTION

An acknowledge channel is used on the reverse channel in a wireless communications system operating in accordance with CDMA2000 standards to signal the base station whether a data packet transmitted on the downlink channel has been received by the mobile terminal. The mobile terminal sends an ACK symbol (+1) when it has successfully recovered the downlink data packet, a NACK symbol (−1) when it has received the packet data but has not recovered it successfully, and a NULL symbol (0) when the mobile terminal doesn't receive anything and remains quiet and sends nothing.

A base station receiver in such a system thus needs to recover the symbol (ACK, NACK, or NULL) sent on the acknowledge channel in order to determine whether it needs to retransmit the data packet again. Such a receiver thus comprises a three-state detector that makes a decision whether an ACK, a NACK, or a NULL has been transmitted by the mobile terminal on the acknowledge channel. The performance of the three-state detector directly impacts the network throughput. Traditionally, a three-state detector is designed to minimize the average probability of detection errors. Such a detector treats the error of detecting an ACK when a NACK was actually sent the same as the error of detecting a NACK when an ACK was actually sent, and so on. FIG. 1 illustrates prior art processing of a received signal "r" acknowledge signal by a base station receiver. As can be noted, after the signal "r" of magnitude R is received (step 101), a determination is made whether R is greater than a threshold T1 (step 102). If it is, then the decision is made that ACK was the symbol that was sent (step 103). If R it isn't greater than threshold T1, then R is compared with another threshold T2 (step 104). If R is less than T2, then the decision is made that NACK was the symbol that was sent (step 105). If, however R is greater than T2, then the decision is made that NULL was the symbol that was sent (step 106).

Disadvantageously, this prior art method does not provide optimal network performance in terms of network throughput. A three-state detector that aims at optimizing the network throughput is therefore desirable.

SUMMARY OF THE INVENTION

In accordance with an embodiment of the present invention, a decision as to whether a mobile terminal has transmitted an ACK, a NACK or a NULL from a received signal at a base station is made by successively eliminating one of the three possible transmitted symbols by sequentially applying decision rules that maximize network throughput by minimizing the sum of the weighted costs of making a decision based on the magnitude of the received signal. The cost of making a decision is based on the effect on overall performance due to choosing a particular symbol as the most likely transmitted symbol when the same or a different symbol was actually transmitted. Each such cost is then weighted by the a priori probability that a particular symbol was actually sent multiplied by the a posteri conditional probability of a decision made on the received signal based on its received magnitude.

The present invention can be applied in any type of communications system in which a multi-state signal is transmitted and in which the overall system performance is affected differently by different combinations of decision errors and in which costs to system performance can be attributed to such decision errors.

DETAILED DESCRIPTION

Figure 1:
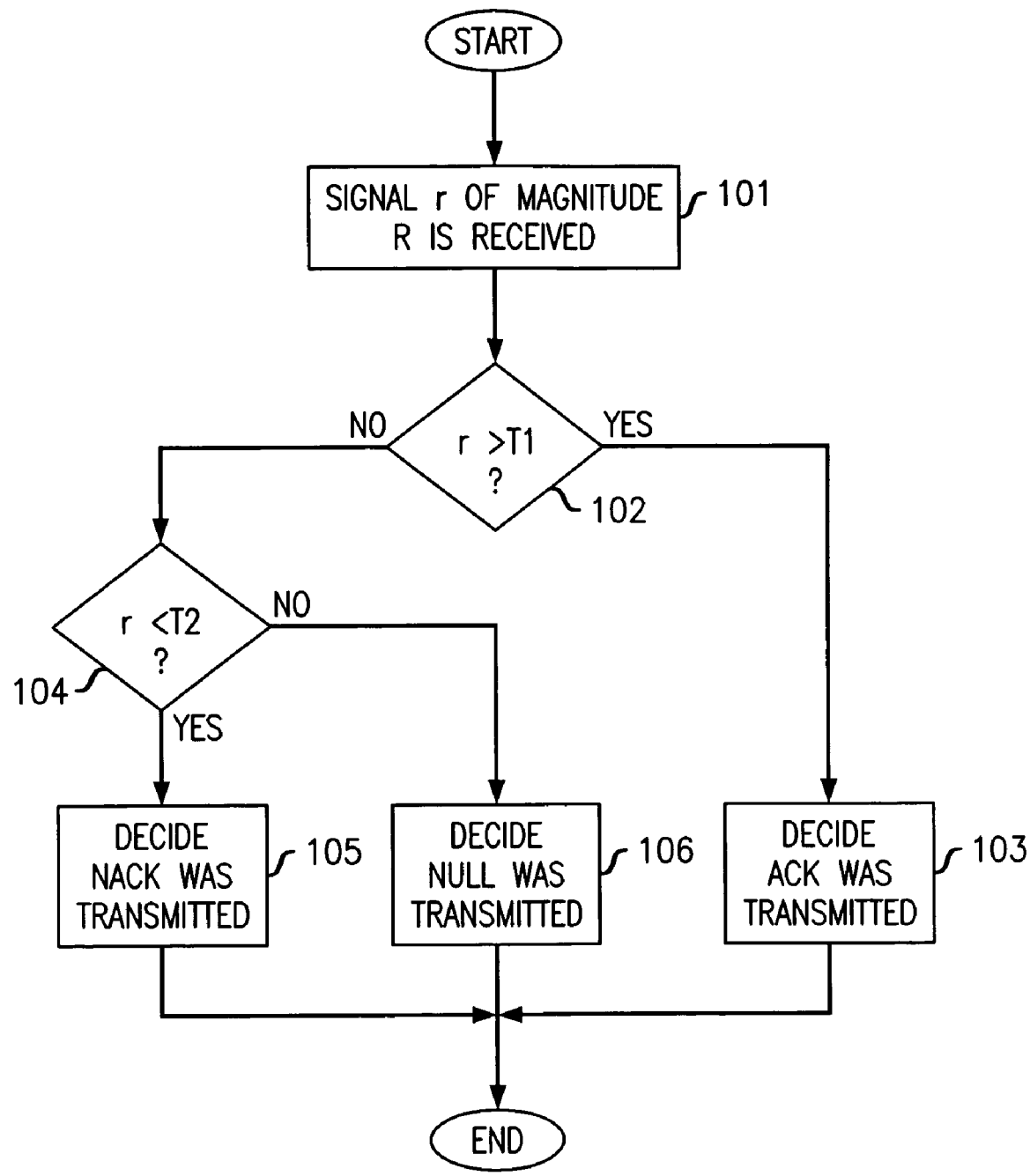
FIG. 1 shows a prior art method of detecting a three-state signal.
Figure 2:
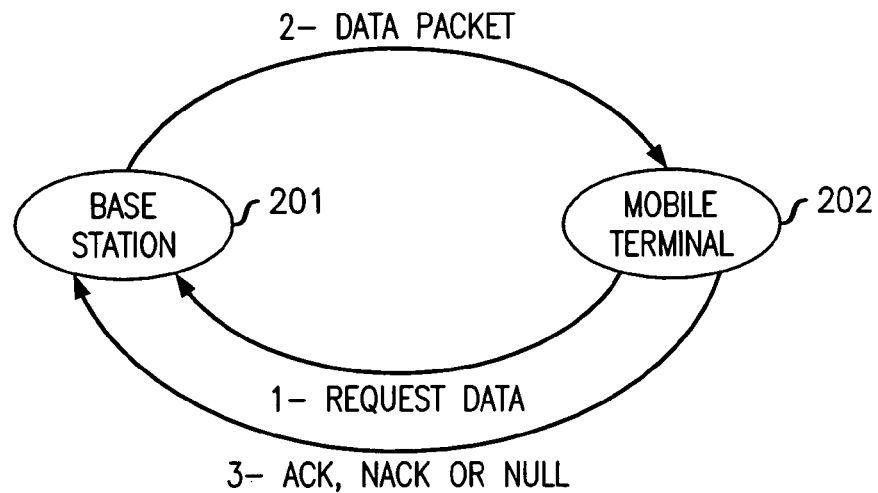
FIG. 2 shows data communication between a mobile terminal and a base station in a wireless communications system.

The described embodiment of the present invention aims at optimizing the network throughput by considering the "cost" of making a detection error for each type of error. FIG. 2 illustrates data communication between a base station 201 and a mobile terminal 202. The mobile terminal 202 first sends a request for data to the base station 201. Base station 201 then responds by transmitting a data packet to the mobile terminal 202. The mobile terminal 202 then responds by sending the base station 201 either an ACK, a NACK or a NULL. If the mobile terminal 202 successfully receives the data (i.e., it received the packet and the packet passed a cyclic redundancy check [CRC]), it sends an ACK. If the CRC check fails, the mobile terminal 202 sends the base station a NACK. If the base station 201 receives an ACK after sending a data packet, it sends a new packet. If it receives a NACK, it resends either the entire packet again or a part of it. If, after a while, it doesn't receive anything from the mobile terminal, the base station treats that occurrence as a NULL and retransmits the entire packet.

Different "costs" can be attributed to making an error in detecting from a received signal what symbol was actually sent by the mobile terminal. For example, if the mobile terminal sends an ACK, but the base station receiver detects it as a NACK or a NULL, the result will "cost" throughput degradation since the base station in response to the NACK or NULL will be resending the mobile terminal a data packet that the mobile terminal already has. This is a waste of resources and the base station could be transmitting a newer data packet to the mobile terminal instead of a data packet that the mobile terminal didn't need to receive again. A worse situation arises when the mobile terminal sends a NACK and the base station detects it as an ACK. The base station then decides that the mobile terminal has received the transmitted data packet and moves on to transmit a new data packet to the mobile station. The mobile terminal will then lose synchronization and eventually much more data will need to be retransmitted by the base station in order for the mobile terminal to regain synchronization. If the mobile terminal transmits a NACK and the base station detects the received signal as a NULL, then if the entire packet would be sent anyway for a NACK, there is no "loss". If, however, the base station normally only transmits a portion of a packet upon receiving a NACK and a full packet upon receiving a NULL, then throughput is affected. If the mobile terminal transmits a NULL and the base station detects the received signal as an ACK, then if the base station had already sent something and the mobile terminal didn't receive it, the base station will assume that what it sent was received and will then send a new data packet, causing synchronization problems at noted above. If the mobile terminal transmits a NULL and the base station detects the received signal as a NACK, the base station will either resend the entire packet or only part of the packet, depending on the base station's philosophy in responding to a NULL and a NACK.

Different "costs" can be attributed to making a detection error for each type of error. Thus, as described above, the "cost" of detecting an ACK when a NACK was actually sent is different from the "cost" of detecting a NACK when an ACK was actually sent. The "costs" are determined by the impact of a specific error to the network throughput. In accordance with an embodiment of the three-state detector of the present invention, the target is to minimize the following risk:

$$\text{Risk} = \sum_{i=0}^{2} \sum_{j=0}^{2} P_j C_{ij} \int_{Z_i} p(r \mid H_i) dr \quad (1)$$

In the above equation, the following definitions apply:

$H_0$, $H_1$ and $H_2$—represent the state of NULL, NACK and ACK, respectively;

$P_0$, $P_1$, and $P_2$—are the a priori probabilities for $H_0$, $H_1$ and $H_2$, respectively;

$C_{ij}$ is the cost of choosing $H_i$ as the transmitted symbol when the symbol $H_3$ was actually sent, ij=0, 1, 2, $C_{ij}$ being in the range of [0,1].

$p(r|H_j)$—is the probability density function (PDF) or a posteri conditional probability of the received (unprocessed) signal r conditioned on $H_j$ having been sent, j=0, 1, 2;

$Z_i$—is the region of the observation space where $H_i$, i=0, 1, 2 is chosen, and which region is chosen so as to minimize the risk.

The Risk is thus a sum of the weighted costs of making each possible decision. It is equal to the sum, for each possible combination of detected symbol and transmitted symbol, of the cost of a choosing a symbol as the most likely transmitted symbol when the same or a different symbol was actually sent multiplied by the a priori probability that a particular symbol was transmitted multiplied by the a posteri conditional probability of a decision on the transmitted symbol given the magnitude of the received signal. By minimizing the Risk, the throughput will be maximized.

It can be mathematically shown that Risk will be minimized by applying the following decision rules at the base station to decide upon what symbol was transmitted by the mobile terminal given the magnitude R of the received signal r:

$$P_1(C_{01} - C_{11})\Lambda_1(R) \begin{array}{c} H_1 \text{ or } H_2 \\ > \\ < \\ H_0 \text{ or } H_2 \end{array} P_0(C_{10} - C_{00}) + P_2(C_{12} - C_{02})\Lambda_2(R) \quad (2)$$

$$P_2(C_{02} - C_{22})\Lambda_2(R) \begin{array}{c} H_2 \text{ or } H_1 \\ > \\ < \\ H_0 \text{ or } H_1 \end{array} P_0(C_{20} - C_{00}) + P_1(C_{21} - C_{01})\Lambda_1(R) \quad (3)$$

$$P_2(C_{12} - C_{22})\Lambda_2(R) \begin{array}{c} H_2 \text{ or } H_0 \\ > \\ < \\ H_1 \text{ or } H_0 \end{array} P_0(C_{20} - C_{10}) + P_1(C_{21} - C_{11})\Lambda_1(R) \quad (4)$$

$$\text{where } X \begin{array}{c} H_2 \text{ or } H_0 \\ > \\ < \\ H_1 \text{ or } H_0 \end{array} Y$$

means that is X>Y then the decision should be $H_2$ or $H_0$, otherwise it should be $H_1$ or $H_0$.

In equations (2), (3) and (4), likelihood ratios $\Lambda_1(R)$ and $\Lambda_2(R)$ are defined as follows:

$$\Lambda_1(R) \equiv \frac{p(r = R \mid H_1)}{p(r = R \mid H_0)}, \text{ and} \quad (5)$$

$$\Lambda_2(R) \equiv \frac{p(r = R \mid H_2)}{p(r = R \mid H_0)}. \quad (6)$$

By sequentially applying these decision rules to the received signal of magnitude R, one transmitted symbol can be eliminated as a possible transmitted symbol from the set of three possible transmitted symbols at each comparison. Thus, after applications of two of these decision rules, the most likely transmitted symbol can be determined. Further, by applying these decision rules in this manner, the Risk that takes into account the cost of making a wrong decision on the system throughput is minimized.

In applying the decision rules to an actual system design, it can be assumed that the interference that causes the magnitude of the received signal to deviate from the signal actually transmitted can be modeled as White Gaussian Noise (WGN). $\Lambda_1(R)$ and $\Lambda_2(R)$ are then given by:

$$\Lambda_1(R) = e^{-K_1 R} \quad (7)$$

$$\Lambda_2(R) = e^{K_2 R} \quad (8)$$

$K_1$ and $K_2$ are dependent on the system design, including such factors as the receiver's automatic gain control (AGC) setting. K1 and K2 are given by:

$$K_1 = \frac{2 \times AGC_{gain} \times \text{Transmitted\_NACK\_amplitude}}{\sigma_{noise}^2} \quad (9)$$

$$K_1 = \frac{2 \times AGC_{gain} \times \text{Transmitted\_ACK\_amplitude}}{\sigma_{noise}^2} \quad (10)$$

With Transmitted_ACK_amplitude=+1 and Transmitted_NACK_amplitude=−1, $K_2$=−$K_1$. In equations (9) and (10), $\sigma^2_{noise}$ is the energy of the thermal noise and the interference caused by other users. Both $AGC_{gain}$ and $\sigma^2_{noise}$ are measurable quantities. Thus, for a given received signal level of r=R, the likelihood ratios, $\Lambda_1(R)$ and $\Lambda_2(R)$, can be calculated.

The notation used in the decision rules of equations (2) through (5) is simplified by defining:

$$A_1 = P_1(C_{01} - C_{11})\Lambda_1(R) \quad (11)$$

$$A_2 = P_0(C_{10} - C_{00}) + P_2(C_{12} - C_{02})\Lambda_2(R) \quad (12)$$

$$B_1 = P_2(C_{02} - C_{21})\Lambda_2(R) \quad (13)$$

$$B_2 = P_0(C_{20} - C_{00}) + P_1(C_{21} - C_{01})\Lambda_1(R) \quad (14)$$

$$C_1 = P_2(C_{12} - C_{22})\Lambda_2(R) \quad (15)$$

$$C_2 = P_0(C_{20} - C_{10}) + P_1(C_{21} - C_{11})\Lambda_1(R) \quad (16)$$

Since the "cost" of choosing a NULL, NACK, or ACK, when a NULL, NACK, or NULL were respectively actually sent can be assumed to be equal to zero, $C_{00}$, $C_{11}$ and $C_{22}$ in equation (11) through (16) can be set to "0", thereby simplifying equations (11) through (16) as follows:

$$A_1 = P_1 C_{01} \Lambda_1(R) \quad (17)$$

$$A_2 = P_0 C_{10} + P_2(C_{12} - C_{02})\Lambda_2(R) \quad (18)$$

$$B_1 = P_2(C_{02} - C_{21})\Lambda_2(R) \quad (19)$$

$$B_2 = P_0 C_{20} + P_1(C_{21} - C_{01})\Lambda_1(R) \quad (20)$$

$$C_1 = P_2 C_{12} \Lambda_2(R) \quad (21)$$

$$C_2 = P_0(C_{20} - C_{10}) + P_1 C_{21} \Lambda_1(R) \quad (22)$$

Figure 3:
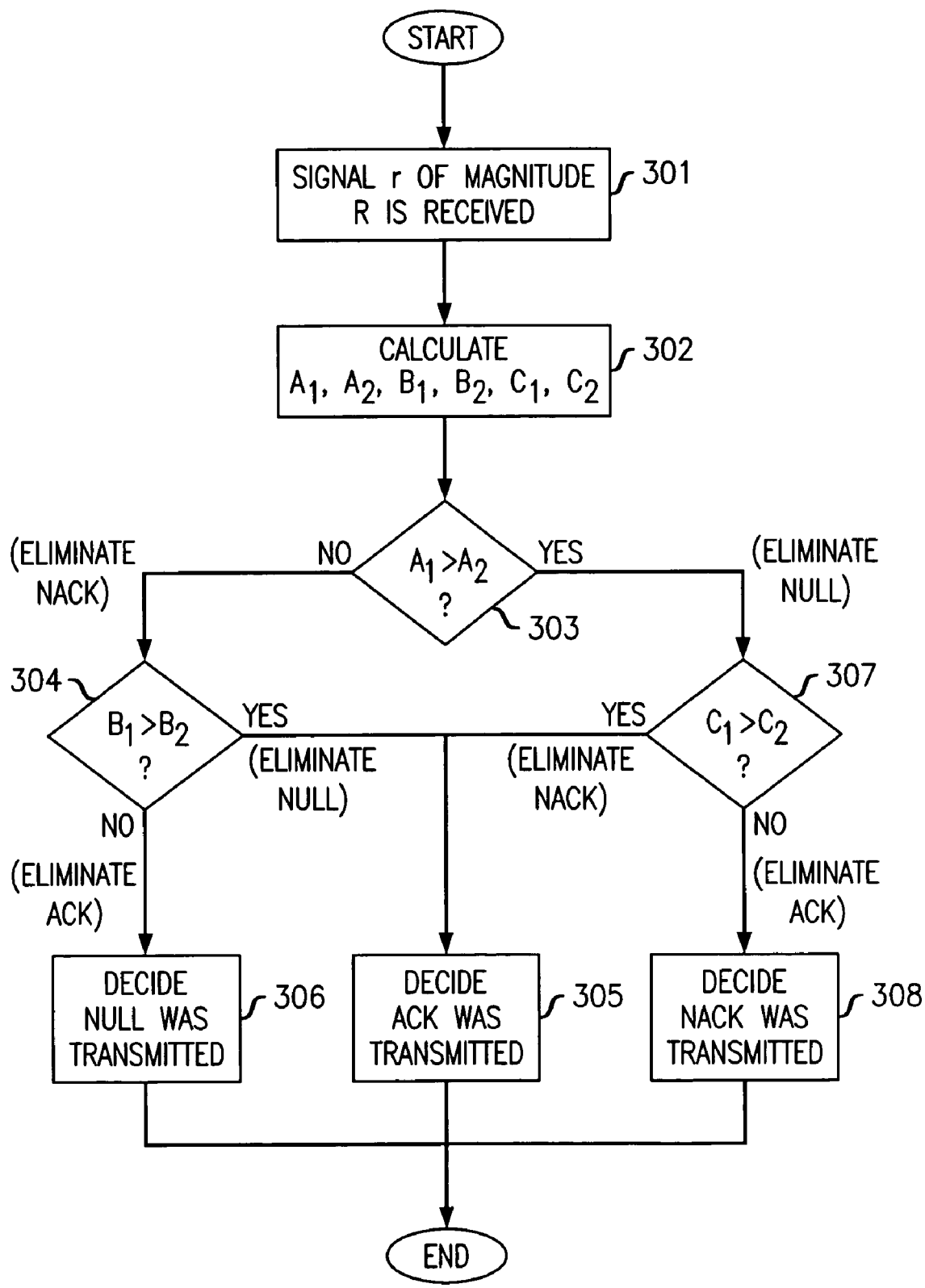
FIG. 3 shows a method of detecting a three-state signal in accordance with an embodiment of the present invention such that network throughput is maximized.

FIG. 3 shows an embodiment of the methodology of the three-state detector of the present invention in which the decision rules defined by equation (2) through (5) are sequentially applied to the received signal in order to decide the most likely symbol sent by the mobile terminal so that the Risk, as defined by equation (1) is minimized. At step 301, the signal r is received having magnitude R. At step 302, $A_1$, $A_2$, $B_1$, $B_2$, $C_1$ and $C_2$ are calculated. At step 303, the decision rule defined by equation (2) is applied by comparing $A_1$ with $A_2$. If $A_1$ is greater than $A_2$, then, in accordance with this decision rule, NULL can be eliminated as a possible transmitted symbol, leaving ACK or NACK as the remaining possibilities for the transmitted symbol. If $A_1$ is less than or equal to $A_2$, then, as per this decision rule, NACK can be eliminated as a possible transmitted symbol, leaving ACK or NULL as the remaining possibilities for the transmitted symbol. If NACK is eliminated as a possible transmitted symbol at step 303, then, at step 304, the decision rule of equation (3) is applied to the remaining possibilities, ACK and NULL. Thus, $B_1$ and $B_2$ are compared with each other in accordance with the decision rule in equation (3). If $B_1$ is greater than $B_2$, then, in accordance with this decision rule of equation (3), NULL is eliminated as a possible transmitted symbol, leaving, at step 305, the ultimate decision of the most likely transmitted symbol to thus be ACK. On the other hand, if $B_1$ is less than or equal to $B_2$, then, in accordance with the decision rule of equation (3), ACK is eliminated as a possible transmitted symbol, leaving, at step 306, the ultimate decision of the most likely transmitted symbol to thus be NULL. If, at step 303, NULL is eliminated as a possible transmitted symbol, then, at step 307, the decision rule of equation (4) is applied to decide between NACK and ACK as being the most likely transmitted symbol. Thus, if $C_1$ is greater than $C_2$, NACK is eliminated as a possible transmitted symbol and, at step 305, ACK is determined as the most likely transmitted symbol. On the other hand, if $C_1$ is less than or equal to $C_2$, then ACK is eliminated as a possible transmitted symbol and, at step 308, the ultimate decision is that NACK is the most likely transmitted symbol.

Figure 4:
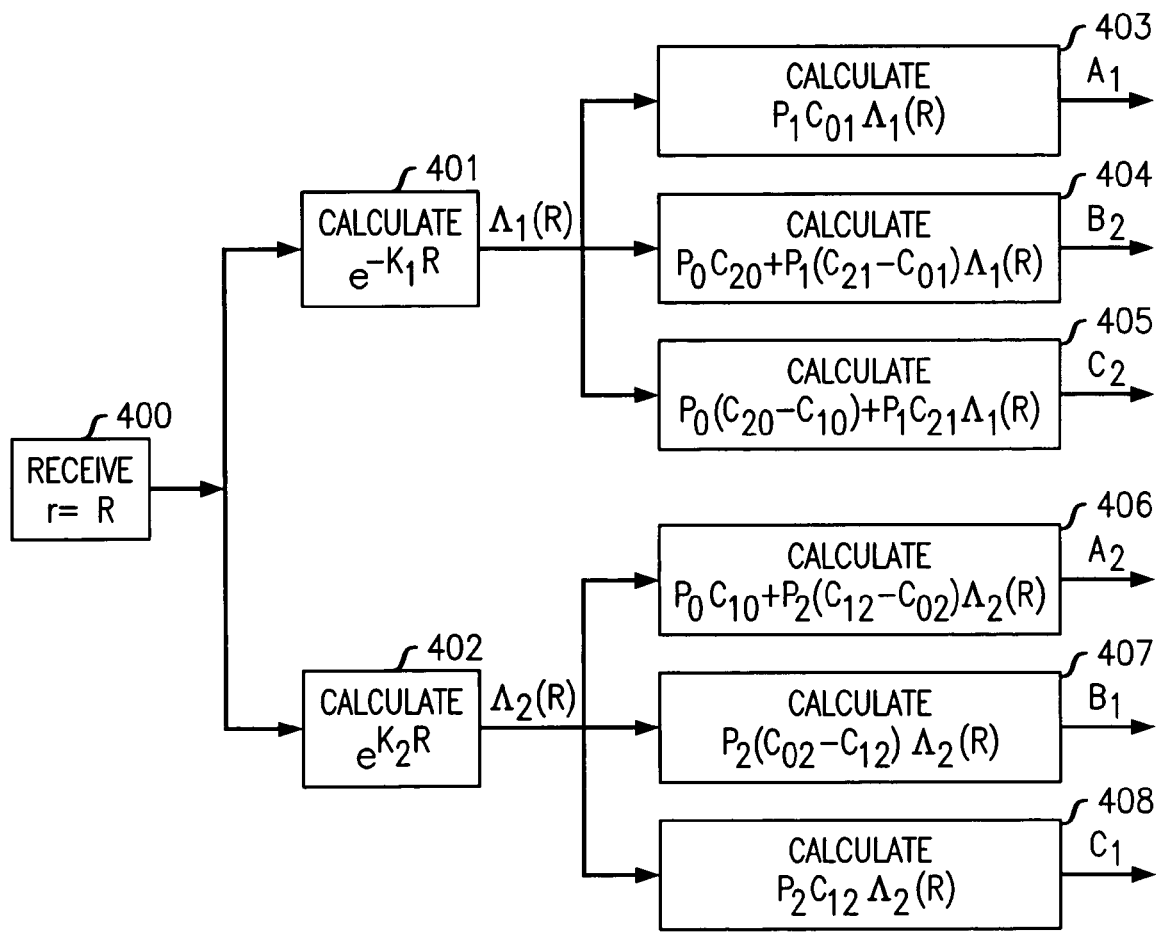
FIG. 4 shows the calculation of the terms used in the decision rules applied to a received signal in determining the most likely transmitted symbol in the method of FIG. 3.

FIG. 4 illustrates the calculation of A1, A2, B1, B2, C1 and C3 from a received input signal r of magnitude R at step 400. At step 401, the likelihood ratio $\Lambda_1(R) = e^{-K_1 R}$ is calculated using equation (9) to determine $K_1$. Similarly, at step 402, the likelihood ratio $\Lambda_2(R) = e^{K_2 R}$ is calculated using equation (10) to determine $K_2$. $A_1$, $B_2$, and $C_2$ are then determined using the calculated $\Lambda_1(R)$ in equations (17), (20) and (22) at steps 403, 404 and 405, respectively. Similarly, $A_2$, $B_1$ and $C_1$ are determined using the calculated $\Lambda_2(R)$ in equation (18), (19) and (21) at steps 406, 407 and 408, respectively. The cost $C_{ij}$ associated with each wrong decision, in the range [0, 1], as well as the a priori probabilities, $P_0$, $P_1$ and $P_2$, associated with each of the three possible transmitted symbols, are supplied by the system based on either system level simulations and/or field measurements.

While the particular invention has been described with reference to the illustrative embodiment, this description should not be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. For example, although described in terms of an embodiment of a three-state detector for detecting whether an ACK, a NACK or a NULL is the symbol transmitted by a mobile station to a base station in a wireless communications system, the present invention can be applied in any type of communications system in which a multi-state signal is transmitted and in which the overall system performance is affected differently by different combinations of decision errors and in which costs to system performance can be attributed to such decision errors. Further, although described in terms of three-state detection, the present invention could be readily applied to any multi-state system. Consequently, the invention may be implemented in different locations, such as at a base station, a base station controller and/or mobile switching center, or elsewhere depending upon in what type of system the invention is employed. Moreover, processing circuitry required to implement and use the described invention may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention. It is therefore contemplated that the appended claims will cover any such modifications or embodiments as fall within the true scope of the invention.

The invention claimed is:

1. A method of determining a transmitted symbol from among a plurality of possible transmitted symbols, the method comprising:

receiving a signal representing one of the possible transmitted symbols;

successively eliminating as the determined transmitted symbol at least one of the plurality of possible transmitted symbols by sequentially applying to the received signal a plurality of decision rules that maximize network throughput by minimizing a sum of weighted costs of making a decision based on a magnitude of the received signal, the cost of making a decision being associated with the effect on overall throughput performance due to choosing a particular symbol as the most likely transmitted symbol when the same or a different symbol was actually transmitted, wherein in the sum, each cost is weighted by an a priori probability that a particular symbol was actually sent multiplied by an a posteriori conditional probability of a decision made on the received signal based on its received magnitude.

2. The method of claim 1 wherein the possible transmitted symbols are an ACK, a NACK and a NULL received by a base station from a mobile terminal in a wireless communication system.

3. The method of claim 1 wherein each cost is normalized to be between 0 and 1.

4. The method of claim 3 wherein the cost of deciding upon a transmitted symbol when that symbol was actually transmitted is zero.

5. A multi-state detector for determining a most likely transmitted symbol from among a plurality of possible transmitted symbols comprising:

means for receiving a signal representing one of the possible transmitted symbols; and means for successively eliminating as the determined transmitted symbol at least one of the plurality of possible transmitted symbols by sequentially applying to the received signal a plurality of decision rules that maximize network throughput by minimizing a sum of weighted costs of making a decision based on a magnitude of the received signal, the cost of making a decision being associated with the effect on overall throughput performance due to choosing a particular symbol as the most likely transmitted symbol when the same or a different symbol was actually transmitted, wherein in the sum each such cost is weighted by an a priori probability that a particular symbol was actually sent multiplied by an a posteriori conditional probability of a decision made on the received signal based on its received magnitude.

6. The detector of claim 5 wherein the possible transmitted symbols are an ACK, a NACK and a NULL received by a base station from a mobile terminal in a wireless communications system.

7. The detector of claim 5 wherein each cost is normalized to be between 0 and 1.

8. The detector of claim 6 wherein the cost of deciding upon a transmitted symbol when that symbol was actually transmitted is zero.

* * * * *